United States Patent [19]
Shah et al.

[11] Patent Number: 5,205,714
[45] Date of Patent: Apr. 27, 1993

[54] AIRCRAFT FAN BLADE DAMPING APPARATUS

[75] Inventors: Samir I. Shah; Ramon Themudo; Michael Even-Nur, all of Cincinnati, Ohio

[73] Assignee: General Electric Company, Cincinnati, Ohio

[21] Appl. No.: 852,833

[22] Filed: Mar. 16, 1992

Related U.S. Application Data

[63] Continuation of Ser. No. 559,792, Jul. 30, 1990, abandoned.

[51] Int. Cl.$^5$ ............................................. F01D 5/26
[52] U.S. Cl. ................................. 416/220 R; 416/217; 416/248; 416/500
[58] Field of Search ............... 416/204 A, 217, 219 R, 416/220 R, 248, 500, 140

[56] References Cited

U.S. PATENT DOCUMENTS

| | | | |
|---|---|---|---|
| 1,833,751 | 11/1931 | Kimball | 416/500 |
| 2,144,428 | 1/1939 | Martin | 416/500 |
| 2,559,131 | 7/1951 | Oestrich et al. | 416/220 R |
| 2,833,515 | 5/1958 | Newcomb . | |
| 2,838,273 | 6/1958 | Stalker | 416/500 |
| 2,936,155 | 5/1960 | Howell et al. | 416/500 |
| 3,027,138 | 3/1962 | Howell et al. | 416/500 |
| 3,734,646 | 5/1973 | Perkins | 416/220 |
| 3,870,434 | 3/1975 | Paulson | 416/217 |
| 4,047,840 | 9/1977 | Ravenhall et al. | 416/141 |
| 4,192,633 | 3/1980 | Hernzer | 416/221 |
| 4,453,891 | 6/1984 | Forestier | 416/220 R |
| 4,460,316 | 7/1984 | Partington | 416/217 |
| 4,474,535 | 10/1984 | Dhuie | 416/221 |
| 4,478,554 | 10/1984 | Surdi | 416/221 |
| 4,483,661 | 11/1984 | Manharth et al. | 416/220 R |
| 4,725,200 | 2/1988 | Welhoelter | 416/221 |
| 4,927,329 | 5/1990 | Kliman et al. | 416/129 |

FOREIGN PATENT DOCUMENTS

549581  5/1977  U.S.S.R. .............................. 416/248

Primary Examiner—Edward K. Look
Assistant Examiner—James A. Larson
Attorney, Agent, or Firm—Jerome C. Squillaro; John R. Rafter

[57] ABSTRACT

Disclosed is apparatus to prevent vibration of a pinned root fan blade during low speed revolution of the blade comprising a damping device which extends between the airfoil of the blade and the engine structure.

26 Claims, 9 Drawing Sheets

AIRCRAFT FAN BLADE DAMPING APPARATUS

This application is a continuation of application Ser. No. 07/559,792, filed Jul. 30, 1990, abandoned.

The invention relates to apparatus to damp gas turbine engine fan blade vibrations in general and to those vibrations that occur at low speed revolutions in particular.

BACKGROUND OF THE INVENTION

Propellers or fan blades are subject to high bending stresses at the roots thereof while rotating at low rotational speeds. Bending stresses at the roots are a problem during low rotational speeds because the centrifugal forces generated by the rotary motion are insufficient to straighten the blade radially. To reduce these stresses it is known in the art to use pinned blade roots. Examples of pinned roots appear in U.S patent application Ser. No. 201,232, filed Jun. 2, 1988, and assigned to the same assignee as the present invention. Such a blade may be attached at its root to a rotating engine structure by a clevis-pin arrangement that provides a predetermined amount of circumferential blade moveability. A pinned root provides flexibility at the root of the fan blades and therefore relieves the bending stresses generated during rotation. While the use of pinned blade roots solves the above-mentioned problem, they create a separate one of their own. Thus, a pinned blade can rotate about the axis of the blade root pin between the extremes allowed by the pinned root in a manner analogous to a pendulum. The flexibility of a pinned root, which is desirable for reducing bending stresses, permits excessive vibrations, oscillations or relative motions of the entire fan blade that may deteriorate the engine cowling and the engine structure adjacent to the blade roots. These motions, which for convenience will be collectively referred to as vibrations, are variously known in the art by the noise created thereby, that is, as a "chatter," "clank," or "hammer." "Chatter" is a problem only at low rotational speeds, such as during windmilling—the low speed turning of the blades caused by the wind. That is, unlike high rotational speeds where the rotationally generated centrifugal force is sufficient to hold the blades radially outward from the axis of rotation and to prevent thereby the secondary rotation of the fan blade between the extremes allowed by the pinned blade root, at low speeds each blade is able to move within its individual rotational arc centered on its pin axis.

Chatter can be an even greater problem when the blades have a high aspect ratio. When operating at high rotational speeds, the centrifugal field operating on the blades is sufficiently strong enough to keep the blade dips from moving circumferentially with respect to each other such that they touch. At low rotational speeds, other forces, such as wind gusts and gravity, are strong enough to overcome the centrifugal force and cause the blades to move circumferentially with respect to each other. Thus, in such blade designs it is possible for the tips of the blades to touch during chattering, thereby creating the potential for damaging the blades in general and the blade tips in particular, both of which are obviously undesirable results.

Furthermore, during low speed rotation of the fan blades each fan blade rotates at a unique instantaneous angular speed due, for example, to differing air foil inertia or to wind gusts. Thus, the load on each pinned blade root varies from blade to blade. In turn, this stresses the blade mounts and can lead to their damage as well as to damage to the actual blade roots.

Thus, it would be desirable to provide a pinned root fan blade that was not subject to the debilitating effects of vibration and unequal loading that occurs during low rotational speeds.

OBJECTS OF THE PRESENT INVENTION

It is a principal object of the present invention to provide a new and improved apparatus that is not subject to the foregoing disadvantages.

It is an object of the present invention to provide new and improved apparatus that will substantially damp fan blade vibrations at low rotational speeds.

It is another object of the present invention to provide new and improved apparatus that will substantially prevent engine cowling and blade root structure deterioration due to fan blade vibrations.

SUMMARY OF THE PRESENT INVENTION

The foregoing objects of the present invention are achieved by providing a damping structure for fan blade vibrations. In accordance with the present invention the structure comprises a damping device which extends between the airfoil portion of the blade and the blade attachment structure. During low speed revolution the damping device damps vibrations of the fan blades that occur by transferring the energy of the vibrations from the relatively low mass fan blade to the comparatively large mass engine. In one embodiment of the present invention the airfoil may include a damping cavity useful on either the leading or trailing edges. In this embodiment the damping device extends between the damping cavity and the blade attachment structure. The damping device may comprise a stiff metal beam or a coil spring.

These and other objects of the present invention, as well as further features thereof, will become apparent from a reading of the following detailed description of the invention in conjunction with the accompanying drawings, all of which are intended to be typical of, rather than in any way limiting on, the scope of the present invention.

DETAILED DESCRIPTION OF THE INVENTION

Figure 1:
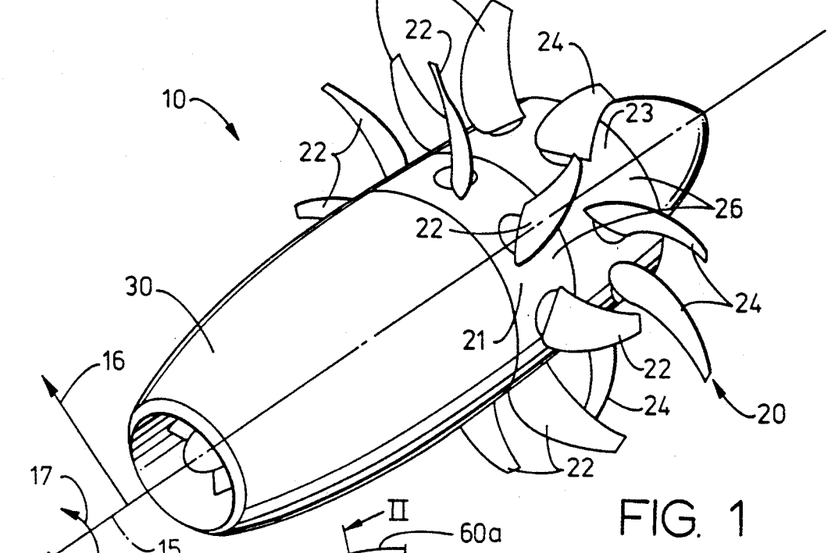
FIG. 1 illustrates in a perspective view a gas turbine engine of the type in which the present invention may find application.

FIG. 1 illustrates a gas turbine engine 10 of a type in which the present invention may find application. For purposes of understanding the present invention, the axial direction is indicated by a line 15, the radial direction by a line 16 lying normal to axial line 15, and the circumferential direction by a circular arrow 17 generally indicating rotation around line 15.

Engine 10 comprises a propulsor section 20 and a gas generator section 30. Gas generator 30, which functions to produce a high energy gas stream, includes, in an axial flow relationship and in a manner well known in the art, a compressor section, a combustor section and a turbine section. Propulsor section 20 includes a pair of counter rotating turbines that extracts energy from the high energy gas stream to drive separate forward and aft circumferentially mounted pluralities of fan blades 21 and 23, respectively. The forward plurality of blades 21 includes individual forward blades 22 while aft plurality of blades 23 includes individual aft blades 24. Also shown in FIG. 1 is an engine cowling 26 through which fan blade pluralities 21 and 23 project.

Figure 2:
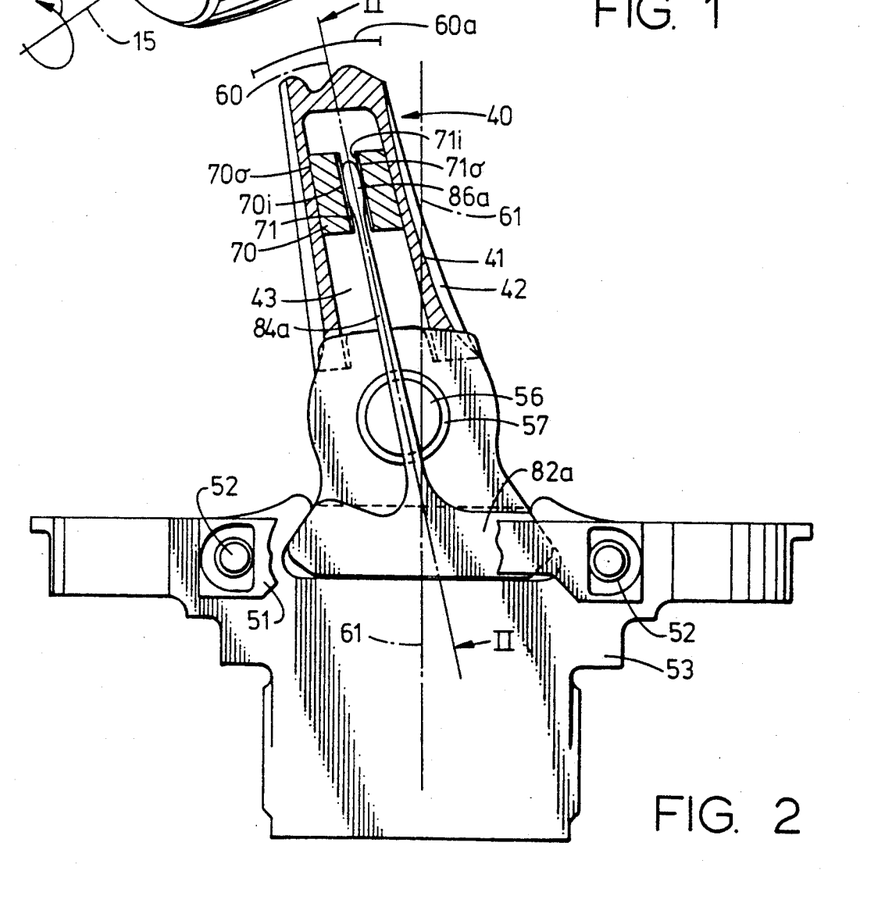
FIG. 2 illustrates in partial cross section looking aft an embodiment of the present invention wherein a damping device is disposed in a fan blade leading edge damping cavity.
Figure 3:
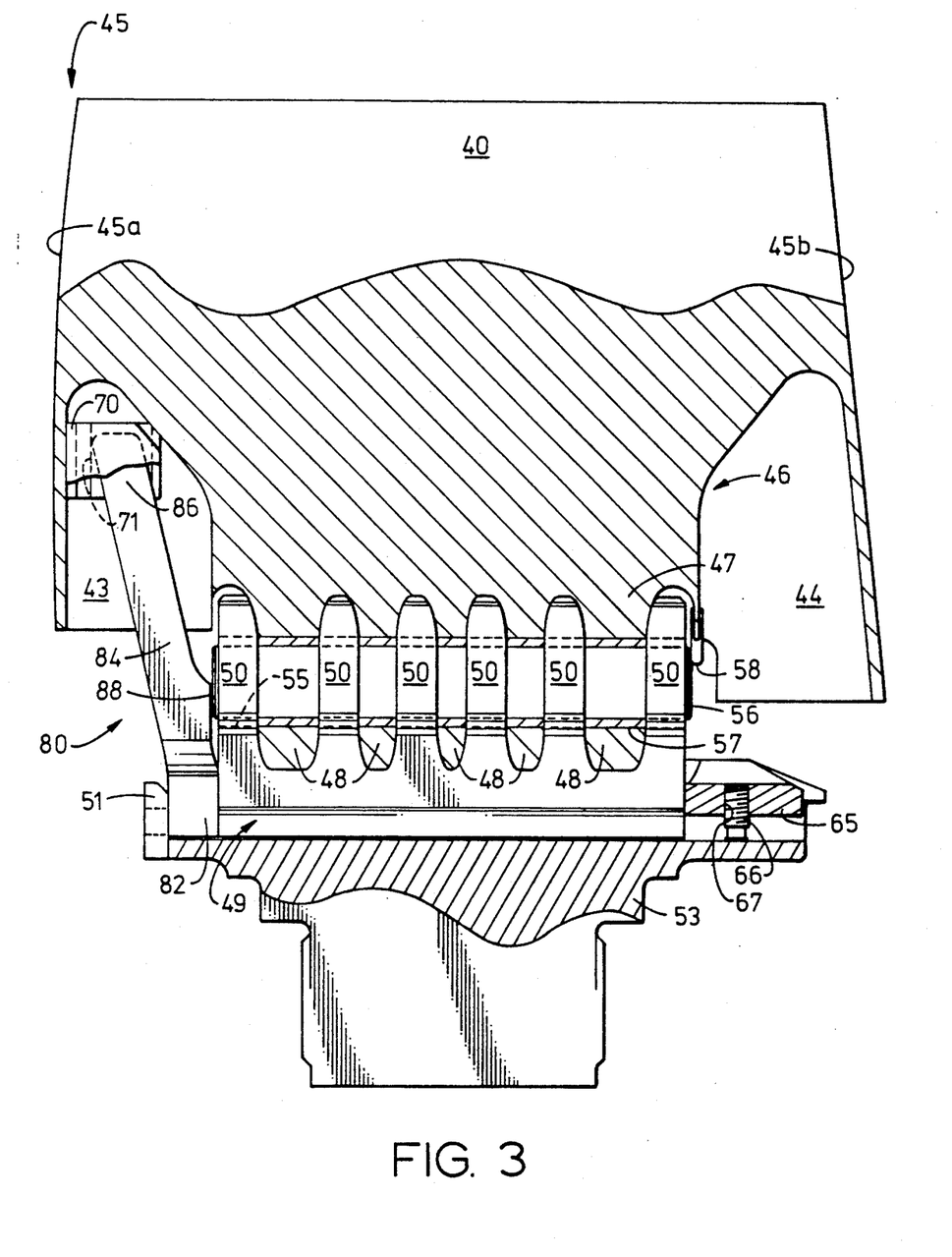
FIG. 3 shows the present invention in partial cross section along lines II—II of FIG. 2.

The blade damping structure of the present invention includes a blade including an airfoil portion, means for mounting the blade to the engine, and means for damping vibrations of the blade, wherein the means for damping extends between the airfoil portion and the means for mounting the blade to the engine. Referring now to FIGS. 2 and 3, the present invention may find application in a fan blade 40, which may be of the type illustrated in FIG. 1, such as fan blades 22 or 24. Fan blade 40 as shown in FIGS. 2 and 3 has a pinned root. As previously noted, such blades are prone to a secondary rotation or vibration at low rotational speeds about a pin such as pin 56 along an arc indicated generally by arrow 60a, which may lead to damage to the fan blade or blade mounts.

As shown in FIGS. 2 and 3, fan blade 40 includes a blade spar portion 41 and a composite portion 42. Blade spar portion 41 is typically a metallic structure while the composite portion 42 is manufactured out of composite materials. The material or materials forming the fan blade are not relevant to the present invention, however. Nor is it relevant that the fan blade 40 has a blade spar portion 41.

Structurally, blade 40 can be divided into two sections for purposes of understanding the present invention. Thus, blade 40 includes an airfoil section 45 having a leading edge 45a and a trailing edge 45b and a blade root section 46 by means of which blade 40 is attached to engine 10 as will be explained in more detail below. In the embodiment shown, blade spar 41 forms part of the airfoil section 45. Included within airfoil 45 are a pair of damping cavities: a leading edge damping cavity 43 and a trailing edge damping cavity 44, best seen in FIGS. 3 and 6. Generally, the cavities would be diposed within that portion of the airfoil that is at least partially exposed to the ambient atmosphere.

Each damping cavity is defined by the walls of a hollowed out section of the leading and trailing edges of the airfoil that is disposed near the blade root. In FIGS. 2, 3, 4 and 6 the damping cavities are shown as formed within the blade spar 41. Each of the damping cavities may include a wear sleeve 70 attached to the walls thereof and a wear pad 71 attached to the wear sleeve. Wear pad 71 preferably has a substantially elliptical configuration defined by inner and outer pad surfaces 71i and 71o respectively. Similarly, wear sleeve 70 preferably has a substantially elliptical configuration defined by inner and outer wear sleeve surfaces 70i and 70o respectively. The exact configuration of wear sleeve 70 and wear pad 71 is not critical; however, wear sleeve 70 must be configured for attachment to the walls of damping cavity 44 and the wear pad 71 must be configured for attachment to the wear sleeve. Wear pad 71 and wear sleeve 70 can be made of any suitable commercially available material.

Blade root 46 includes a clevis 47 having a plurality of clevis fingers 48 which project radially inward from blade root 46. Clevis fingers 48 intermesh with a corresponding plurality of platform clevis fingers 50 that form part of a platform clevis 49. Blade 40 is attached to engine 10 by means of a pin 56 inserted within a pin hole 55 that extends axially through each clevis finger 48 and each mating platform clevis finger 50. Pin 56 is retained within pin hole 55 at the trailing edge of blade 40 by a pin retaining clip 58. A bushing 57 disposed within pin hole 55 substantially prevents wear of the pin hole during blade rotation. Platform clevis 49 is retained within a trunnion 53 of engine 10 by means of a clamp 51. Clamp 51 is bolted to trunnion 53 by a pair of clamp bolts 52 that substantially extend the length of blade root and platform clevis 46 and 49, respectively. Platform clevis 49 is further restrained from movement within trunnion 53 by means of a locking lug 65 located at the trailing edge thereof, which locking lug is in turn held in place in part by a lug pin 66 that is inserted into a radially directed hole 67 disposed in locking lug 65.

Figure 4A:
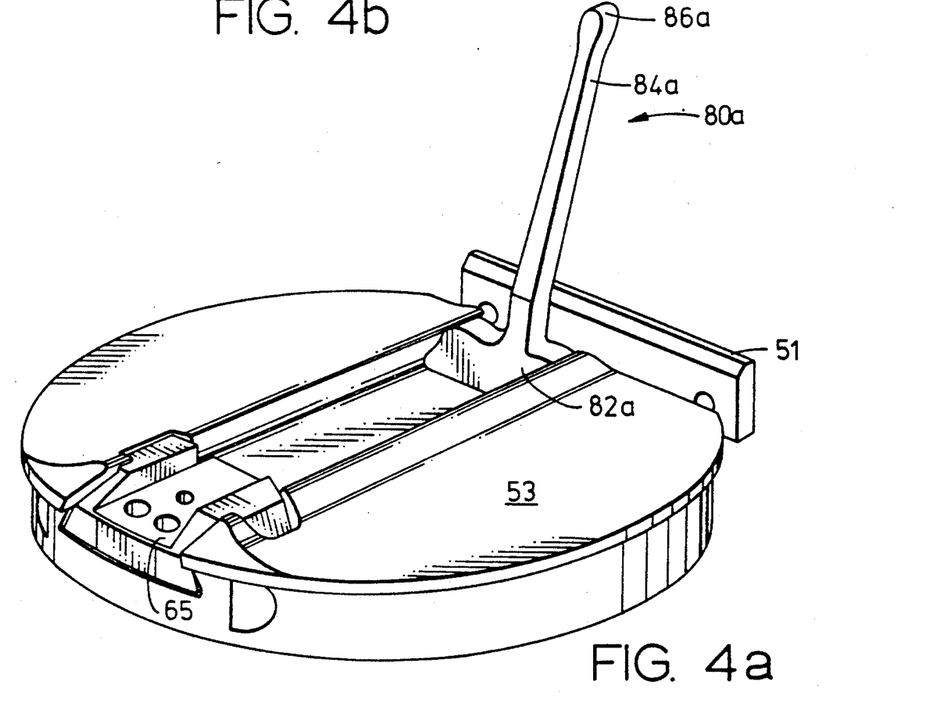
FIG. 4a illustrates a preferred embodiment of the damper of the present invention in a perspective view.

As seen in FIGS. 2 and 3, and as best seen in FIG. 4a, the present invention further comprises a damper 80a including a base member 82a, a spring member 84a and a spring member tip 86a. As depicted there, base member 82a has a length substantially equal to the width of clevis 48 and has a substantially rectangular cross section. Spring member 84a, which is integral with base member 82a, extends substantially radially outward from the base member along a blade axis 60 and has a generally parallelepiped configuration. Spring member tip 86a has a bulbous end 86a which is widened in the circumferential dimension as best seen in FIG. 2 and which functions to prevent spring member 84a from catching on wear pad 71 or wear sleeve 70. Spring member tip 86a makes contact with wear pad 71. Damping device 80 is firmly anchored against mating clevis 49 by means of clamp 51 as best seen in FIG. 3. Furthermore, as best seen there, damper 80 may additionally function to retain pin 56 within pin hole 55 at the leading edge of blade 40 by means of a dog 88 extending aft from spring member 84a.

In operation, at low rotation speeds, any vibration leading to chattering or hammering will be damped by damping device 80. Thus, for example, the vibrations created by gusts of wind or different rotational inertia of an individual blade will be transferred from the blade to the engine structure by means of the damping device. While shown as a spring beam, spring member 84a could equally well comprise other spring devices known in the art, such as a coil spring 84b shown in FIG. 4b.

Figure 4B:
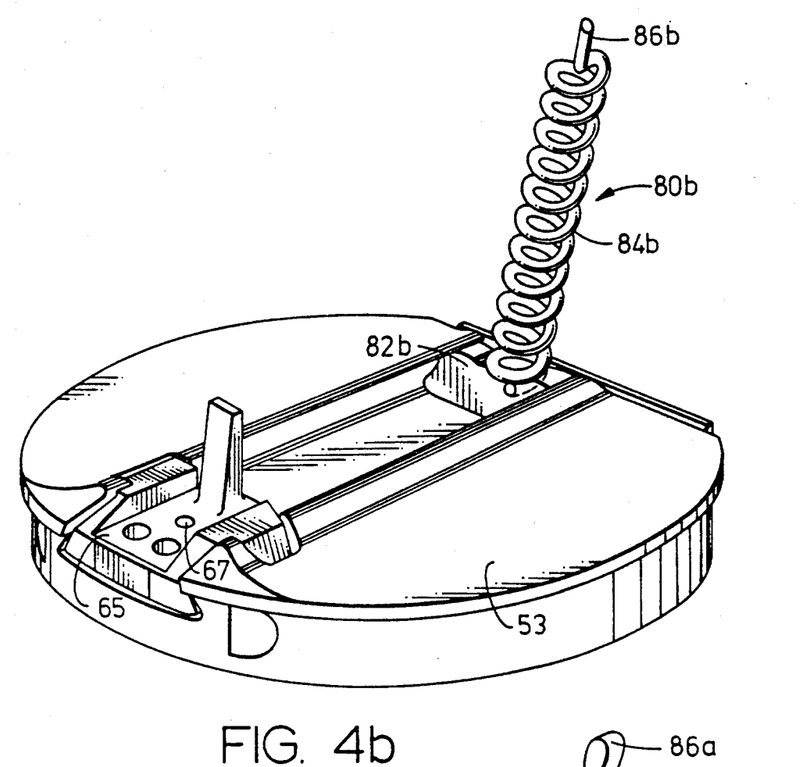
FIG. 4b illustrates an alternative embodiment of the damper of the present invention in a perspective view.

FIG. 4b depicts an alternate embodiment of the damper shown in FIG. 4a wherein damper 80b includes a base member 82b, a spring member 84b, and a spring member tip 86b. In this embodiment, spring member 84b is configured as a coil spring. This particular embodiment as shown is for a trailing edge cavity configuration, but would function equally well in a leading edge cavity.

Figure 5:
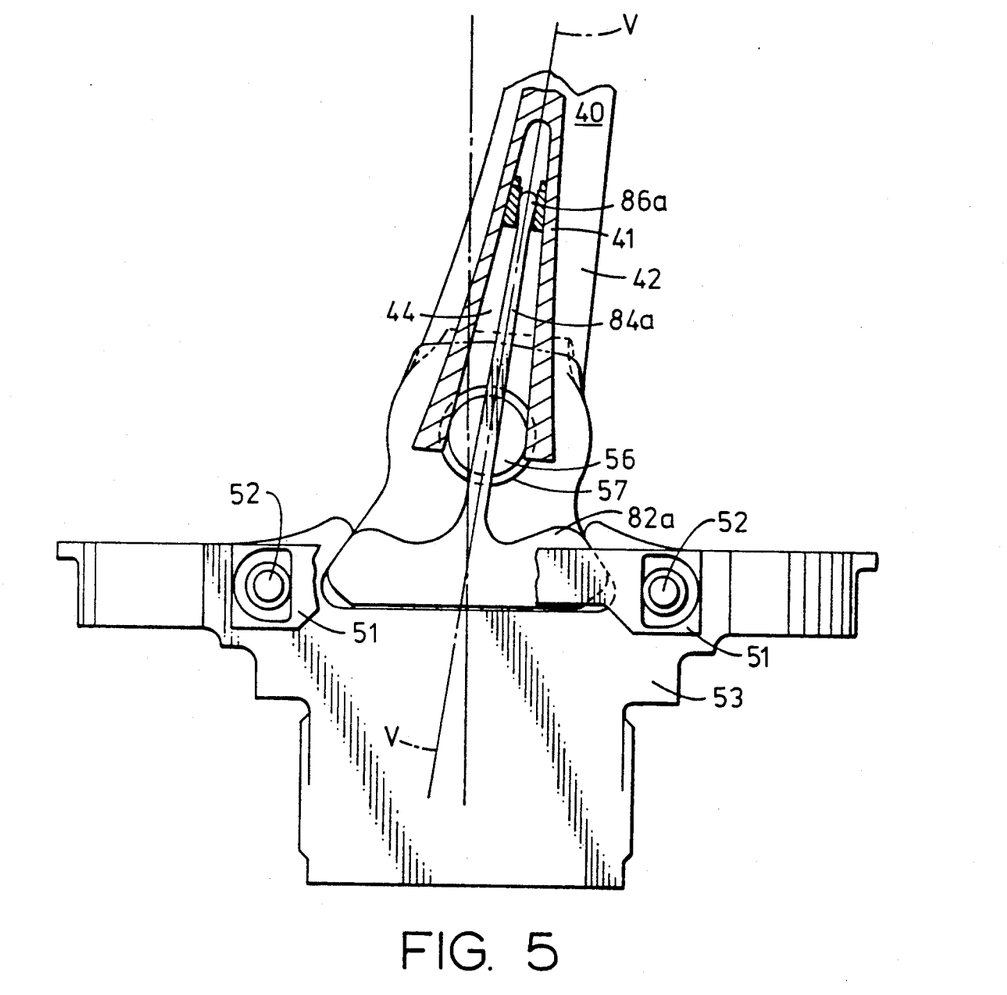
FIG. 5 depicts in partial cross section looking forward an embodiment of the present invention wherein a damping device is disposed in a fan blade trailing edge damping cavity.
Figure 6:
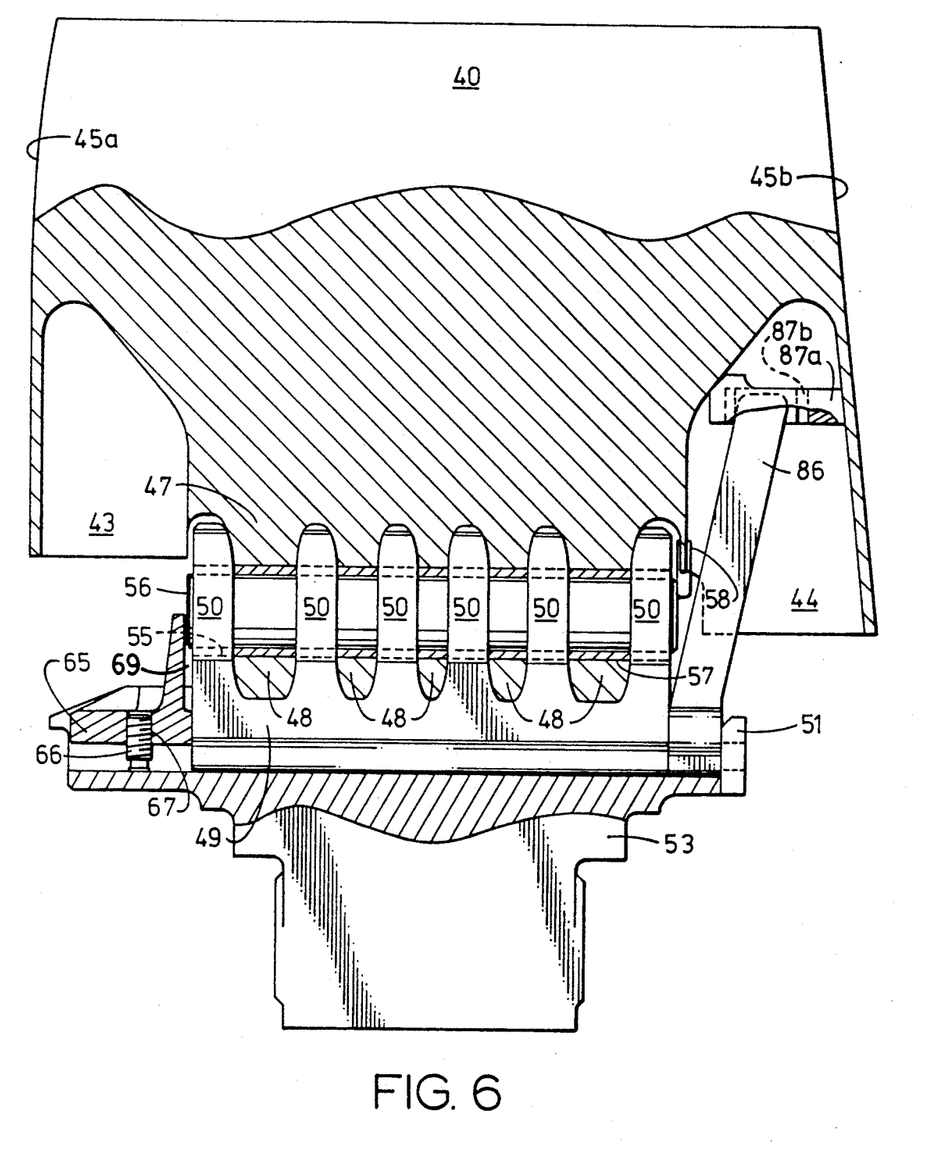
FIG. 6 illustrates in partial cross section of the present invention as depicted in FIG. 5 along lines V—V.

FIGS. 5 and 6 depict an embodiment of the present invention wherein damping device 80 extends between the trailing edge of blade 40 and the blade mounting structure. Thus, as shown in the Figures, blade 40 includes a trailing edge damping cavity 44 of a similar nature to that described with reference leading edge cavity 43. Trailing edge damping cavity 44 need not have a configuration identical to leading edge damping cavity 43. Thus, it may have a different geometry than its counterpart due, for example, to the geometry of fan blade 40. Damping device 80a includes, as previously mentioned, a base member 82a and a spring member 84a extending radially outward therefrom. Spring member 84a includes a bulbous end 86a which contacts a wear pad 71 attached to a wear sleeve 87 which in turn is affixed within trailing edge damping cavity 44. In this particular embodiment pin 56 is still retained at the trailing edge by a retaining clip 58. However, since damping device 80 is now positioned at the trailing edge of the blade, the pin 56 is retained at the leading edge by a lug retainer 69 extending radially from locking lug 65. As with the previously described embodiment, locking lug 65 is in turn retained in relation to trunnion 53 by a lug pin 66.

In operation, when placed at the trailing edge of blade 40, damping device 80a operates to effectively transfer any vibratory motion of the blade to the engine, thereby eliminating chatter. In all other respects the embodiment depicted in FIGS. 5 and 6 is similar to that depicted in FIGS. 2 and 3, with the exception that in the trailing edge position spring member 84a need not have dog 88 to retain pin 56 within pin hole 55 due to the presence of retaining clip 58. Alternatively, pin retaining clip 58 could be eliminated and spring member 84 could include a dog 88 to retain pin 56 at the trailing edge.

Figure 7:
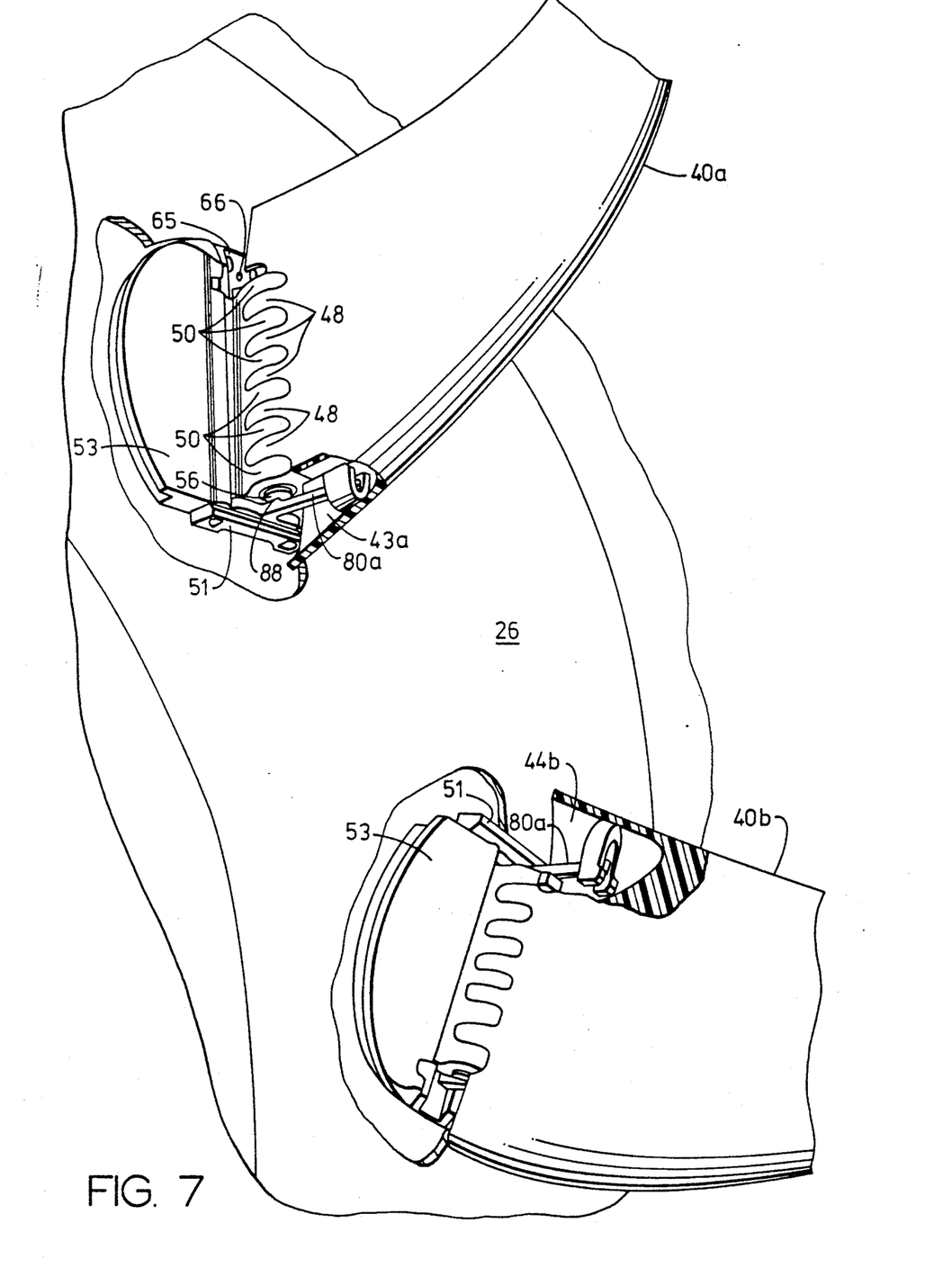
FIG. 7 shows in a partial perspective cross section an example of a damped fan blade row in which the present invention may find use.

FIG. 7 depicts a relative positioning of the damping devices with respect to adjacent blades. Damping device 80a extends between the leading edge of blade 40a and the engine 10. In the adjacent blade, damping device 80a extends between the trailing edge of blade 40b and engine 10. Thus, in the situation where each plurality of fan blades consists of an even number, it is desirable to alternately locate the damping device in the trailing and leading edges of the fan blades. That is, as shown in the Figure, a fan blade 40a having a damping device installed in a leading edge cavity 43a thereof would be adjacent to a fan blade 40b having the damping device installed in a trailing edge cavity 44b. In such a manner the damping devices would alternate from leading to trailing edges circumferentially around the blade row.

Where the fan blade plurality is an odd number, of necessity two blades of the plurality lying adjacent to each other would have damping members installed in the leading or trailing edges thereof with the remaining blades having their damping devices installed in alternate leading and trailing edge damping cavities. It is equally satisfactory to install the damping devices in all of the leading edge damping cavities or in all of the trailing edge damping cavities or in some combination thereof so long as blade rotational balance is maintained.

Figure 8A:
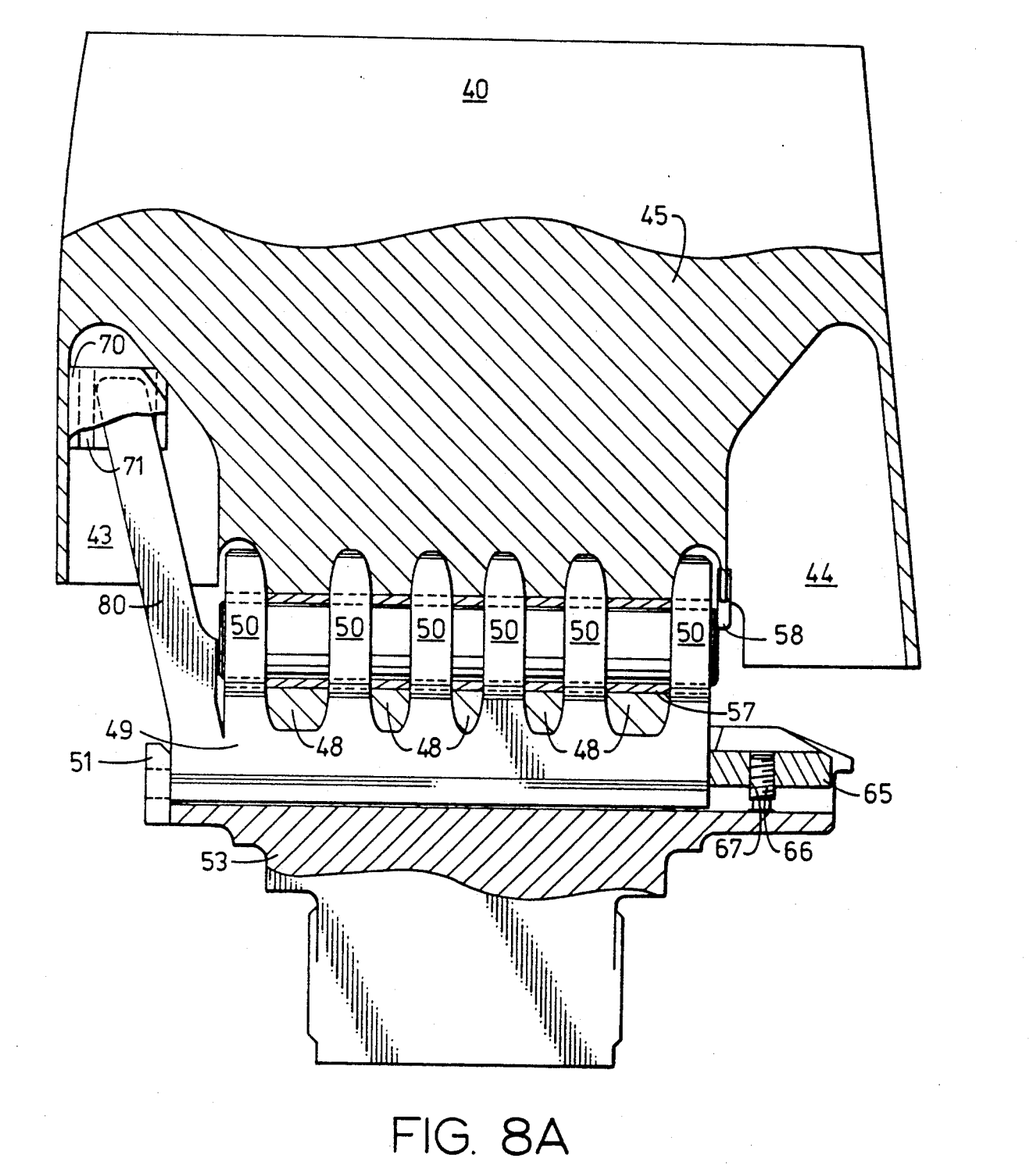
FIGS. 8a–c depicts other embodiments of the present invention.
Figure 8B:
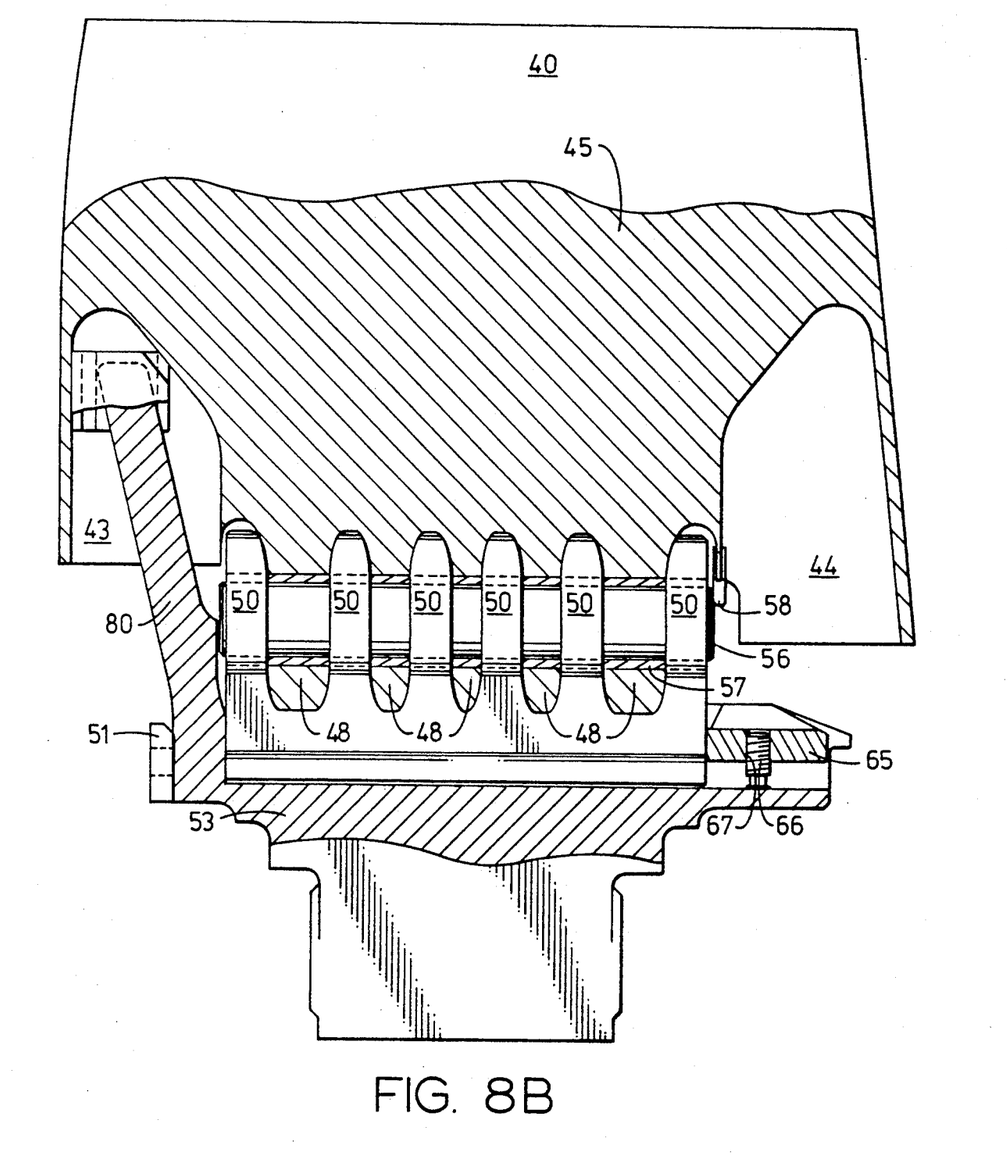
Figure 8C:
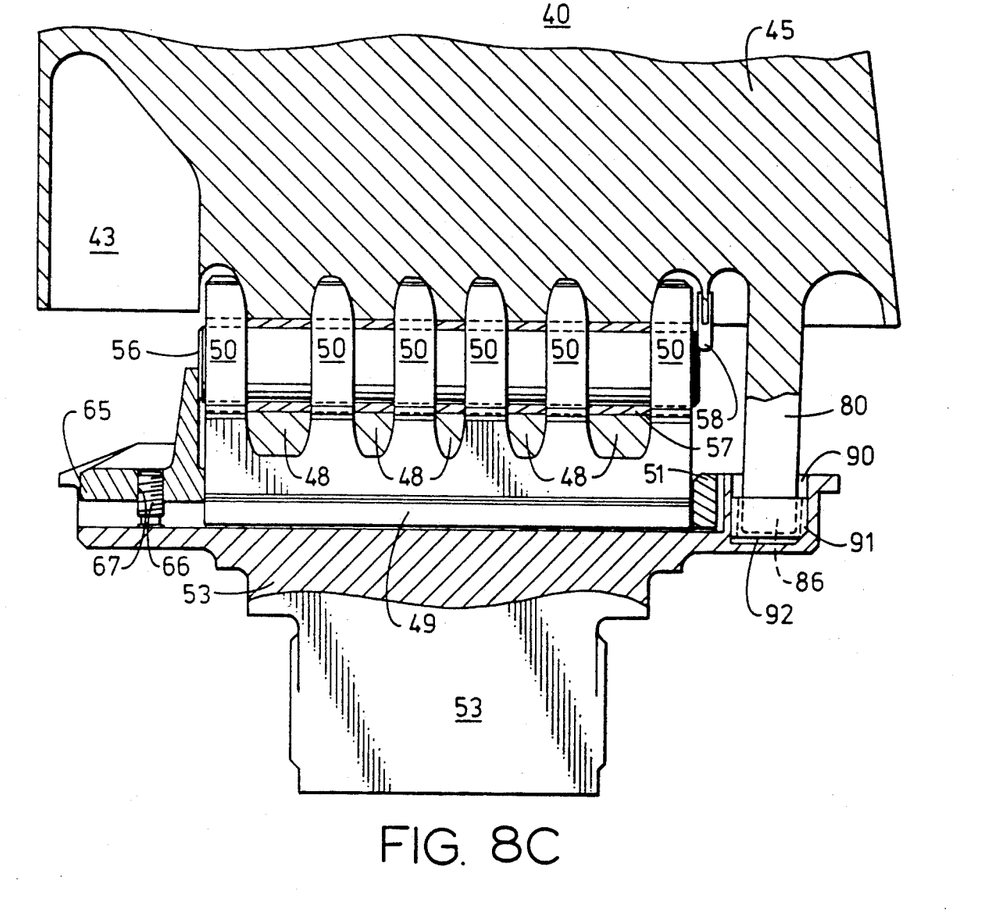

FIGS. 8a, 8b, and 8c illustrate further alternatives with respect to the present invention wherein damping device 80 is made integral with some portion of the fan blade or blade mounting structure. Thus, FIG. 8a shows damping device 80 made with integral platform clevis 49. In FIG. 8b the damping device 80 is made integral with trunnion 53. Finally, in FIG. 8c damping device 80 is made integral with airfoil 45 and the free or bulbous end 86 extends therefrom into a trunnion damping cavity 90 where it contacts a trunnion wear pad 92 held in place by a trunnion wear sleeve 91. It should be noted that the same arrangements would work in the trailing edge pockets as well as the leading edge pockets.

Having thus described preferred embodiments of the present invention, numerous changes, substitutions, modification and alterations will now suggest themselves to those skilled in the art all of which fall within the spirit and scope of the present invention. Accordingly, it is intended that the invention be limited only by the scope of the appended claims.

What is claimed is:

1. A blade damping structure for a gas turbine engine, said structure comprising:
   a. a blade including an airfoil portion configured to define a damping cavity;
   b. means for mounting said blade to a gas turbine engine;
   c. means for damping vibrations of said blade, said means for damping
      i) extending between said airfoil portion and said means for mounting, and
      ii) including a base member and a spring member attached thereto and extending therefrom, wherein said base member is integral with said means for mounting; and
   d. wherein said blade includes a clevis and wherein said means for mounting includes a mating clevis and a trunnion attached thereto.

2. A blade damping structure for a gas turbine engine, said structure comprising:
   a. a blade including an airfoil portion configured to define a damping cavity;
   b. means for mounting said blade to a gas turbine engine;
   c. means for damping vibrations of said blade, said means for damping
      i) extending between said airfoil portion and said means for mounting, and
      ii) including a base member and a spring member attached thereto and extending therefrom, wherein said base member and said means for mounting comprise a one-piece construction; and
   d. wherein said damping cavity includes a wear sleeve having a substantially elliptical configuration defined in part by an inner wear sleeve surface; and
   e. a wear pad having a substantially elliptical configuration defined by inner and outer wear pad surfaces, said outer wear pad surface attached to said inner wear sleeve surface, said means for damping contacting said inner wear pad surface.

3. The structure of claim 2 wherein said damping cavity communicates with ambient atmosphere.

4. The structure of claim 3 wherein said damping cavity is disposed in a trailing edge of said blade.

5. The structure of claim 3 wherein said damping cavity is disposed in a leading edge of said blade.

6. The structure of claim 2 wherein said spring member includes a free end having a bulbous configuration, and wherein said free end of said spring member extends into said damping cavity.

7. The structure of claim 6 wherein said blade includes a clevis and wherein said means for mounting includes a mating clevis and a trunnion attached thereto.

8. At least one damped fan blade row driven by a gas turbine engine, said damped fan blade row comprising:
  a. a plurality of fan blades, each of said blades including an airfoil portion defined in part by a leading and trailing edge; said airfoil portion of each of said plurality of fan blades includes at least one damping cavity disposed in selected ones of said leading and trailing edges of said fan blades;
  b. a plurality of means for attaching individual ones of said plurality of fan blades to a gas turbine engine; and
  c. a plurality of means for damping said individual ones of said fan blades, one of said plurality of means for damping extending between said means for attaching and
said airfoil portion of each of said fan blades wherein said plurality of fan blades is an even number and wherein each of alternate ones of said fan blades has its associated said means for damping associated with a damping cavity disposed in the leading edge thereof and each of the remaining interdigitated fan blades has its associated said means for damping associated with a damping cavity disposed in the trailing edge thereof.

9. At least one damped fan blade row driven by a gas turbine engine, said damped fan blade row comprising:
  a. a plurality of fan blades, each of said blades including an airfoil portion defined in part by a leading and trailing edge; said airfoil portion of each of said plurality of fan blades includes at least one damping cavity disposed in selected ones of said leading and trailing edges of said fan blades;
  b. a plurality of means for attaching individual ones of said plurality of fan blades to a gas turbine engine;
  c. a plurality of means for damping said individual ones of said fan blades, one of said plurality of means for damping extending between said means for attaching and said airfoil portion of each of said fan blades wherein said plurality of fan blades is an even number and wherein each of alternate ones of said fan blades has its associated said means for damping associated with a damping cavity disposed in the leading edge thereof and each of the remaining interdigitated fan blades has its associated said means for damping associated with a damping cavity disposed in the trailing edge thereof; and
  d. wherein each of said fan blades further includes a clevis and wherein said means for attaching includes a trunnion attached to a gas turbine engine and a mating clevis attached to said trunnion, said mating clevis being configured for intermeshing with said clevis.

10. At least one damped fan blade row driven by a gas turbine engine, said damped fan blade row comprising:
  a. a plurality of fan blades, each of said blades including an airfoil portion defined in part by a leading and trailing edge; said airfoil portion of each of said plurality of fan blades includes at least one damping cavity disposed in selected ones of said leading and trailing edges of said fan blades;
  b. a plurality of means for attaching individual ones of said plurality of fan blades to a gas turbine engine;
  c. a plurality of means for damping said individual ones of said fan blades, one of said plurality of means for damping extending between said means for attaching and
said airfoil portion of each of said fan blades wherein said plurality of fan blades is an even number and wherein each of alternate ones of said fan blades has its associated said means for damping associated with a damping cavity disposed in the leading edge thereof and each of the remaining interdigitated fan blades has its associated said means for damping associated with a damping cavity disposed in the trailing edge thereof;
  d. wherein each of said fan blades further includes a clevis and wherein said means for attaching includes a trunnion attached to a gas turbine engine and a mating clevis attached to said trunnion, said mating clevis being configured for intermeshing with said clevis; and
  e. wherein said damping cavity includes
    i) a wear sleeve having a substantially elliptical configuration defined in part by an inner wear sleeve surface; and
    ii) a wear pad having a substantially elliptical configuration defined by inner and outer wear pad surfaces, said outer wear pad surface attached to said inner wear sleeve surface, said means for damping contacting said inner wear pad surface.

11. At least one damped fan blade row driven by a gas turbine engine, said damped fan blade row comprising:
  a. a plurality of fan blades, each of said blades including an airfoil portion defined in part by a leading and trailing edge; said airfoil portion of each of said plurality of fan blades includes at least one damping cavity disposed in selected ones of said leading and trailing edges of said fan blades;
  b. a plurality of means for attaching individual ones of said plurality of fan blades to a gas turbine engine;
  c. a plurality of means for damping said individual ones of said fan blades, one of said plurality of means for damping extending between said means for attaching and said airfoil portion of each of said fan blades wherein said plurality of fan blades is an even number and wherein each of alternate ones of said fan blades has its associated said means for damping associated with a damping cavity disposed in the leading edge thereof and each of the remaining interdigitated fan blades has its associated said means for damping associated with a damping cavity disposed in the trailing edge thereof;
  d. wherein each of said fan blades further includes a clevis and wherein said means for attaching includes a trunnion attached to a gas turbine engine and a mating clevis attached to said trunnion, said mating clevis being configured for intermeshing with said clevis;
  e. wherein said damping cavity includes
    i) a wear sleeve having a substantially elliptical configuration defined in part by an inner wear sleeve surface; and
    ii) a wear pad having a substantially elliptical configuration defined by inner and outer wear pad surfaces, said outer wear pad surface attached to said inner wear sleeve surface, said means for damping contacting said inner wear pad surface; and f. wherein at least one of said means for damping includes a base member and an elongate spring member attached thereto and extending therefrom, said spring member having a free end having a bulbous configuration and contacting said inner wear pad surface.

12. At least one damped fan blade row driven by a gas turbine engine, said damped fan blade row comprising:
   a. a plurality of fan blades, each of said blades including an airfoil portion defined in part by a leading and trailing edge; said airfoil portion of each of said plurality of fan blades includes at least one damping cavity disposed in selected ones of said leading and trailing edges of said fan blades;
   b. a plurality of means for attaching individual ones of said plurality of fan blades to a gas turbine engine;
   c. a plurality of means for damping said individual ones of said fan blades, one of said plurality of means for damping extending between said means for attaching and said airfoil portion of each of said fan blades wherein said plurality of fan blades is an even number and wherein each of alternate ones of said fan blades has its associated said means for damping associated with a damping cavity disposed in the leading edge thereof and each of the remaining interdigitated fan blades has its associated said means for damping associated with a damping cavity disposed in the trailing edge thereof;
   d. wherein each of said fan blades further includes a clevis and wherein said means for attaching includes a trunnion attached to a gas turbine engine and a mating clevis attached to said trunnion, said mating clevis being configured for intermeshing with said clevis;
   e. wherein said damping cavity includes
      i) a wear sleeve having a substantially elliptical configuration defined in part by an inner wear sleeve surface; and
      ii) a wear pad having a substantially elliptical configuration defined by inner and outer wear pad surfaces, said outer wear pad surface attached to said inner wear sleeve surface, said means for damping contacting said inner wear pad surface; and
   f. wherein at least one of said means for damping comprises a base member and an elongate spring member attached thereto and extending therefrom, wherein said spring member comprises a coil spring.

13. At least one damped fan blade row driven by a gas turbine engine, said damped fan blade row comprising:
   a. a plurality of fan blades, each of said blades including an airfoil portion defined in part by a leading and trailing edge; said airfoil portion of each of said plurality of fan blades includes at least one damping cavity disposed in selected ones of said leading and trailing edges of said fan blades;
   b. a plurality of means for attaching individual ones of said plurality of fan blades to a gas turbine engine; and
   c. a plurality of means for damping said individual ones of said fan blades, one of said plurality of means for damping extending between said means for attaching and said airfoil portion of each of said fan blades wherein said plurality of fan blades is an odd number and wherein at least a pair of adjacent fan blades have their associated means for damping associated with damping cavities similarly disposed in relation to one edge of said fan blades and wherein each of alternate ones of said remaining fan blades has its associated said means for damping associated with a similarly diposed damping cavity and each of the remaining interdigitated fan blades has its associated said means for damping associated with a damping cavity disposed in the other edge thereof.

14. At least one damped fan blade row driven by a gas turbine engine, said damped fan blade row comprising:
   a. a plurality of fan blades, each of said blades including an airfoil portion defined in part by a leading and trailing edge; said airfoil portion of each of said plurality of fan blades includes at least one damping cavity disposed in selected ones of said leading and trailing edges of said fan blades;
   b. a plurality of means for attaching individual ones of said plurality of fan blades to a gas turbine engine;
   c. a plurality of means for damping said individual ones of said fan blades, one of said plurality of means for damping extending between said means for attaching and said airfoil portion of each of said fan blades wherein said plurality of fan blades is an odd number and wherein at least a pair of adjacent fan blades have their associated means for damping associated with damping cavities similarly disposed in relation to one edge of said fan blades and wherein each of alternate ones of said remaining fan blades has its associated said means for damping associated with a similarly diposed damping cavity and each of the remaining interdigitated fan blades has its associated said means for damping associated with a damping cavity disposed in the other edge thereof; and
   d. wherein each of said fan blades includes a clevis and wherein said means for attaching includes a trunnion attached to a gas turbine engine and a mating clevis attached to said trunnion, said mating clevis being configured for mating with said clevis.

15. At least one damped fan blade row driven by a gas turbine engine, said damped fan blade row comprising:
   a. a plurality of fan blades, each of said blades including an airfoil portion defined in part by a leading and trailing edge; said airfoil portion of each of said plurality of fan blades includes at least one damping cavity disposed in selected ones of said leading and trailing edges of said fan blades;
   b. a plurality of means for attaching individual ones of said plurality of fan blades to a gas turbine engine;
   c. a plurality of means for damping said individual ones of said fan blades, one of said plurality of means for damping extending between said means for attaching and said airfoil portion of each of said fan blades wherein said plurality of fan blades is an odd number and wherein at least a pair of adjacent fan blades have their associated means for damping associated with a damping cavities similarly disposed in relation to one edge of said fan blades and wherein each of alternate ones of said remaining fan blades has its associated said means for damping associated with a similarly disposed damping cavity and each of the remaining interdigitated fan blades has its associated said means for damping associated with a damping cavity disposed in the other edge thereof;
   d. wherein each of said fan blades includes a clevis and wherein said means for attaching includes a trunnion attached to a gas turbine engine and a mating clevis attached to said trunnion, said mating clevis being configured for mating with said clevis; and e. wherein each said damping cavity includes
  i) a wear sleeve having a substantially elliptical configuration defined in part by an inner wear sleeve surface; and
  ii) a wear pad having a substantially elliptical configuration defined by inner and outer wear pad surfaces, said outer wear pad surface attached to said inner wear sleeve surface, said means for damping contacting said inner wear pad surface.

16. At least one damped fan blade row driven by a gas turbine engine, said damped fan blade row comprising:
  a. a plurality of fan blades, each of said blades including an airfoil portion defined in part by a leading and trailing edge; said airfoil portion of each of said plurality of fan blades includes at least one damping cavity disposed in selected ones of said leading and trailing edges of said fan blades;
  b. a plurality of means for attaching individual ones of said plurality of fan blades to a gas turbine engine;
  c. a plurality of means for damping said individual ones of said fan blades, one of said plurality of means for damping extending between said means for attaching and said airfoil portion of each of said fan blades wherein said plurality of fan blades is an odd number and wherein at least a pair of adjacent fan blades have their associated means for damping associated with damping cavities similarly disposed in relation to one edge of said fan blades and wherein each of alternate ones of said remaining fan blades has its associated said means for damping associated with a similarly disposed damping cavity and each of the remaining interdigitated fan blades has its associated said means for damping associated with a damping cavity disposed in the other edge thereof;
  d. wherein each of said fan blades includes a clevis and wherein said means for attaching includes a trunnion attached to a gas turbine engine and a mating clevis attached to said trunnion, said mating clevis being configured for mating with said clevis;
  e. wherein each said damping cavity includes
    i) a wear sleeve having a substantially elliptical configuration defined in part by an inner wear sleeve surface; and
    ii) a wear pad having a substantially elliptical configuration defined by inner and outer wear pad surfaces, said outer wear pad surface attached to said inner wear sleeve surface, said means for damping contacting said inner wear pad surface; and
  f. wherein at least one of said means for damping includes a base member and an elongate spring member attached thereto and extending therefrom, said spring member having a free end having a bulbous configuration.

17. At least one damped fan blade row driven by a gas turbine engine, said damped fan blade row comprising:
  a. a plurality of fan blades, each of said blades including an airfoil portion defined in part by a leading and trailing edge; said airfoil portion of each of said plurality of fan blades includes at least one damping cavity disposed in selected ones of said leading and trailing edges of said fan blades;
  b. a plurality of means for attaching individual ones of said plurality of fan blades to a gas turbine engine;
  c. a plurality of means for damping said individual ones of said fan blades, one of said plurality of means for damping extending between said means for attaching and said airfoil portion of each of said fan blades wherein said plurality of fan blades is an odd number and wherein at least a pair of adjacent fan blades have their associated means for damping associated with damping cavities similarly disposed in relation to one edge of said fan blades and wherein each of alternate ones of said remaining fan blades has its associated said means for damping associated with a similarly disposed damping cavity and each of the remaining interdigitated fan blades has its associated said means for damping associated with a damping cavity disposed in the other edge thereof;
  d. wherein each of said fan blades includes a clevis and wherein said means for attaching includes a trunnion attached to a gas turbine engine and a mating clevis attached to said trunnion, said mating clevis being configured for mating with said clevis;
  e. wherein each said damping cavity includes
    i) a wear sleeve having a substantially elliptical configuration defined in part by an inner wear sleeve surface;
    ii) a wear pad having a substantially elliptical configuration defined by inner and outer wear pad surfaces, said outer wear pad surface attached to said inner wear sleeve surface, said means for damping contacting said inner wear pad surface; and
  f. wherein at least one of said means for damping comprises a base member and an elongate spring member attached thereto, wherein said spring member comprises a coil spring.

18. At least one damped fan blade row driven by a gas turbine engine, said damped fan blade row comprising:
  a. a plurality of fan blades, each of said blades including an airfoil portion defined in part by a leading and trailing edge; said airfoil portion of each of said plurality of fan blades includes at least one damping cavity disposed in selected ones of said leading and trailing edges of said fan blades;
  b. a plurality of means for attaching individual ones of said plurality of fan blades to a gas turbine engine;
  c. a plurality of means for damping said individual ones of said fan blades, one of said plurality of means for damping extending between said means for attaching and said airfoil portion of each of said fan blades wherein said plurality of fan blades is an even number and wherein each of alternate ones of said fan blades has its associated said means for damping associated with a damping cavity disposed in the leading edge thereof and each of the remaining interdigitated fan blades has its associated said means for damping associated with a damping cavity disposed in the trailing edge thereof; and
  d. wherein each of said fan blades comprises a clevis and wherein each said means for attaching comprises a trunnion attached to a gas turbine engine and a mating clevis attached to said trunnion, said mating clevis being configured for mating with said clevis.

19. At least one damped fan blade row driven by a gas turbine engine, said damped fan blade row comprising:

a. a plurality of fan blades, each of said blades including an airfoil portion defined in part by a leading and trailing edge; said airfoil portion of each of said plurality of fan blades includes at least one damping cavity disposed in selected ones of said leading and trailing edges of said fan blades;
b. a plurality of means for attaching individual ones of said plurality of fan blades to a gas turbine engine;
c. a plurality of means for damping said individual ones of said fan blades, one of said plurality of means for damping extending between said means for attaching and said airfoil portion of each of said fan blades wherein said plurality of fan blades is an even number and wherein each of alternate ones of said fan blades has its associated said means for damping associated with a damping cavity disposed in the leading edge thereof and each of the remaining interdigitated fan blades has its associated said means for damping associated with a damping cavity disposed in the trailing edge thereof;
d. wherein each of said fan blades comprises a clevis and wherein each said means for attaching comprises a trunnion attached to a gas turbine engine and a mating clevis attached to said trunnion, said mating clevis being configured for mating with said clevis; and
e. wherein each said damping cavity includes
  i) a wear sleeve having a substantially elliptical configuration defined in part by an inner wear sleeve surface; and
  ii) a wear pad having a substantially elliptical configuration defined by inner and outer wear pad surfaces, said outer wear pad surface attached to said inner wear sleeve surface, said means for damping contacting said inner wear pad surface.

20. At least one damped fan blade row driven by a gas turbine engine, said damped fan blade row comprising:
a. a plurality of fan blades, each of said blades including an airfoil portion defined in part by a leading and trailing edge; said airfoil portion of each of said plurality of fan blades includes at least one damping cavity disposed in selected ones of said leading and trailing edges of said fan blades;
b. a plurality of means for attaching individual ones of said plurality of fan blades to a gas turbine engine;
c. a plurality of means for damping said individual ones of said fan blades, one of said plurality of means for damping extending between said means for attaching and said airfoil portion of each of said fan blades wherein said plurality of fan blades is an even number and wherein each of alternate ones of said fan blades has its associated said means for damping associated with a damping cavity disposed in the leading edge thereof and each of the remaining interdigitated fan blades has its associated said means for damping associated with a damping cavity disposed in the trailing edge thereof;
d. wherein each of said fan blades comprises a clevis and wherein each said means for attaching comprises a trunnion attached to a gas turbine engine and a mating clevis attached to said trunnion, said mating clevis being configured for mating with said clevis;
e. wherein each said damping cavity includes
  i) a wear sleeve having a substantially elliptical configuration defined in part by an inner wear sleeve surface; and
  ii) a wear pad having a substantially elliptical configuration defined by inner and outer wear pad surfaces, said outer wear pad surface attached to said inner wear sleeve surface, said means for damping contacting said inner wear pad surface;
f. wherein at least one of said means for damping comprises a base member and an elongate spring member attached thereto and extending therefrom, said spring member having a free end having a bulbous configuration.

21. At least one damped fan blade row driven by a gas turbine engine, said damped fan blade row comprising:
a. a plurality of fan blades, each of said blades including an airfoil portion defined in part by a leading and trailing edge; said airfoil portion of each of said plurality of fan blades includes at least one damping cavity disposed in selected ones of said leading and trailing edges of said fan blades;
b. a plurality of means for attaching individual ones of said plurality of fan blades to a gas turbine engine;
c. a plurality of means for damping said individual ones of said fan blades, one of said plurality of means for damping extending between said means for attaching and said airfoil portion of each of said fan blades wherein said plurality of fan blades is an even number and wherein each of alternate ones of said fan blades has its associated said means for damping associated with a damping cavity disposed in the leading edge thereof and each of the remaining interdigitated fan blades has its associated said means for damping associated with a damping cavity disposed in the trailing edge thereof;
d. wherein each of said fan blades comprises a clevis and wherein each said means for attaching comprises a trunnion attached to a gas turbine engine and a mating clevis attached to said trunnion, said mating clevis being configured for mating with said clevis;
e. wherein each said damping cavity includes
  i) a wear sleeve having a substantially elliptical configuration defined in part by an inner wear sleeve surface; and
  ii) a wear pad having a substantially elliptical configuration defined by inner and outer wear pad surfaces, said outer wear pad surface attached to said inner wear sleeve surface, said means for damping contacting said inner wear pad surface; and
f. wherein at least one of said means for damping comprises a base member and an elongate spring member attached thereto, wherein said spring member comprises a coil spring.

22. A blade damping structure for a gas turbine engine, said structure comprising:
a. a blade including an airfoil portion configured to define a damping cavity in a leading edge of said blade;
b. means for mounting said blade to a gas turbine engine;
c. means for damping vibrations of said blade, said means for damping extending between said airfoil portion and said means for mounting; and
d. wherein said damping cavity includes a wear sleeve having a substantially elliptical configuration defined in part by an inner wear sleeve surface; and e. a wear pad having a substantially elliptical configuration defined by inner and outer wear pad surfaces, said outer wear pad surface attached to said inner wear sleeve surface, said means for damping contacting said inner wear pad surface wherein said blade includes a clevis and wherein said means for mounting includes a platform clevis and a trunnion attached thereto and wherein said means for damping includes a base member and a spring member attached thereto and extending therefrom, wherein said base member and said platform clevis comprise a one-piece construction, said spring member including a free end, and wherein said free end of said spring member extends into said damping cavity.

23. A blade damping structure for a gas turbine engine, said structure comprising:
   a. a blade including an airfoil portion configured to define a damping cavity in a leading edge of said blade;
   b. means for mounting said blade to a gas turbine engine;
   c. means for damping vibrations of said blade, said means for damping extending between said airfoil portion and said means for mounting;
   d. wherein said damping cavity includes a wear sleeve having a substantially elliptical configuration defined in part by an inner wear sleeve surface; and
   e. a wear pad having a substantially elliptical configuration defined by inner and outer wear pad surfaces, said outer wear pad surface attached to said inner wear sleeve surface, said means for damping contacting said inner wear pad surface wherein said blade includes a clevis and wherein said means for mounting includes a platform clevis and a trunnion attached thereto and wherein said means for damping includes a base member and a spring member attached thereto and extending therefrom, wherein said base member and said trunnion comprise a one-piece construction, said spring member including a free end, and wherein said free end of said spring member extends into said damping cavity.

24. A blade damping structure for a gas turbine engine, said structure comprising:
   a. a blade including an airfoil portion configured to define a damping cavity in a leading edge of said blade;
   b. means for mounting said blade to a gas turbine engine;
   c. means for damping vibrations of said blade, said means for damping extending between said airfoil portion and said means for mounting;
   d. wherein said damping cavity includes a wear sleeve having a substantially elliptical configuration defined in part by an inner wear sleeve surface; and
   e. a wear pad having a substantially elliptical configuration defined by inner and outer wear pad surfaces, said outer wear pad surface attached to said inner wear sleeve surface, said means for damping contacting said inner wear pad surface wherein said blade includes a clevis and wherein said means for mounting includes a platform clevis and a trunnion attached thereto and wherein said means for damping includes a base member integral with said platform clevis and a spring member attached thereto and extending therefrom, said spring member including a free end, and wherein said free end of said spring member extends into said damping cavity and contacts said inner wear pad surface.

25. A blade damping structure for a gas turbine engine, said structure comprising:
   a. a blade including an airfoil portion configured to define a damping cavity in a leading edge of said blade;
   b. means for mounting said blade to a gas turbine engine;
   c. means for damping vibrations of said blade, said means for damping extending between said airfoil portion and said means for mounting;
   d. wherein said damping cavity includes a wear sleeve having a substantially elliptical configuration defined in part by an inner wear sleeve surface; and
   e. a wear pad having a substantially elliptical configuration defined by inner and outer wear pad surfaces, said outer wear pad surface attached to said inner wear sleeve surface, said means for damping contacting said inner wear pad surface wherein said blade includes a clevis and wherein said means for mounting includes a platform clevis and a trunnion attached thereto and wherein said means for damping includes a base member integral with said platform clevis and a spring member attached thereto and extending therefrom, said spring member having a substantially parallelpiped configuration and including a free end having a bulbous configuration, and wherein said free end of said spring member extends into said damping cavity and contacts said inner wear pad surface.

26. A blade damping structure for a gas turbine engine, said structure comprising:
   a. a blade including an airfoil portion configured to define a damping cavity in a leading edge of said blade;
   b. means for mounting said blade to a gas turbine engine;
   c. means for damping vibrations of said blade, said means for damping extending between said airfoil portion and said means for mounting;
   d. wherein said damping cavity includes a wear sleeve having a substantially elliptical configuration defined in part by an inner wear sleeve surface; and
   e. a wear pad having a substantially elliptical configuration defined by inner and outer wear pad surfaces, said outer wear pad surface attached to said inner wear sleeve surface, said means for damping contacting said inner wear pad surface wherein said blade includes a clevis and wherein said means for mounting includes a platform clevis and a trunnion attached thereto and wherein said means for damping includes a base member integral with said platform clevis and a spring member attached thereto and extending therefrom, said spring member comprising a coil spring including a free end, and wherein said free end of said coil spring extends into said damping cavity and contacts said inner wear pad surface.

* * * * *